(12) United States Patent
Haddad et al.

(10) Patent No.: US 12,197,180 B2
(45) Date of Patent: Jan. 14, 2025

(54) GENERATOR SET WITH MULTIPLE CONTROLLERS FOR LOAD SHARING

(71) Applicant: Caterpillar Inc., Peoria, IL (US)

(72) Inventors: Christopher Haddad, Morris, IL (US); Christopher W. Menge, Monmouth, IL (US); Viswanadha Koppolu, Dunlap, IL (US); Raman Jamloki, Pune (IN); Matthew Headley, Galesburg, IL (US); Matthew L. Andrews, Woodstock, GA (US)

(73) Assignee: Caterpillar Inc., Peoria, IL (US)

( * ) Notice: Subject to any disclaimer, the term of this patent is extended or adjusted under 35 U.S.C. 154(b) by 32 days.

(21) Appl. No.: 18/169,334

(22) Filed: Feb. 15, 2023

(65) Prior Publication Data

US 2024/0272598 A1   Aug. 15, 2024

(51) Int. Cl.
| | |
|---|---|
| *G05B 19/04* | (2006.01) |
| *F02B 63/04* | (2006.01) |
| *F02D 29/06* | (2006.01) |
| *G05B 19/042* | (2006.01) |

(52) U.S. Cl.
CPC .......... *G05B 19/042* (2013.01); *F02B 63/042* (2013.01); *F02D 29/06* (2013.01); *F02D 2200/101* (2013.01); *G05B 2219/2623* (2013.01)

(58) Field of Classification Search
CPC .......... F02B 63/02; F02B 63/04; F02D 29/06; G05B 19/042; B60K 1/00; B60K 20/02; B60K 23/02; B60K 26/021; B60K 2026/023; B60L 15/20; B60L 15/2054; B60L 50/60; B60L 2240/423; B60L 2240/463; B60L 2240/80; B60L 2250/26; B60L 2260/20; B60L 2260/44; Y02T 10/70; Y02T 10/72; H02K 7/1815; H02J 3/381; H02J 3/466; H02J 2300/10

See application file for complete search history.

(56) References Cited

U.S. PATENT DOCUMENTS

| | | | |
|---|---|---|---|
| 8,766,479 B2 | 7/2014 | Dorn et al. | |
| 9,806,530 B2 | 10/2017 | Martinez | |
| 10,491,004 B2 | 11/2019 | Gerdes et al. | |
| 11,300,934 B2 * | 4/2022 | Madhireddy | H02J 3/40 |
| 2005/0034023 A1 | 2/2005 | Maturana et al. | |

(Continued)

FOREIGN PATENT DOCUMENTS

| | | |
|---|---|---|
| CN | 206248793 U | 6/2017 |
| CN | 206386186 U | 8/2017 |

(Continued)

*Primary Examiner* — Hai H Huynh
*Assistant Examiner* — Johnny H Hoang

(57) ABSTRACT

A first generator set may store, in a memory of the first generator set, data representing local attributes associated with an engine. The first generator set may receive, via a network switch of the first generator set, remote data representing remote attributes associated with a second generator set. The first generator set may cause the first controller to update, based on the remote data, the local data in the memory to synchronize the local attributes with the remote attributes. The first generator set may transmit, via the network switch, an indication that the local data was successfully updated in the memory.

20 Claims, 5 Drawing Sheets

(56) References Cited

U.S. PATENT DOCUMENTS

| | | | | |
|---|---|---|---|---|
| 2009/0312885 A1* | 12/2009 | Buiel | ............... | H02J 3/32 |
| | | | | 700/297 |
| 2010/0102637 A1* | 4/2010 | Dozier | ............... | H02J 3/466 |
| | | | | 307/153 |
| 2010/0156191 A1* | 6/2010 | Dozier | ............... | H02J 3/38 |
| | | | | 307/81 |
| 2011/0320053 A1* | 12/2011 | Dozier | ............... | H02J 3/38 |
| | | | | 700/287 |
| 2012/0105098 A1* | 5/2012 | Hancock | ............... | G01R 31/42 |
| | | | | 324/765.01 |
| 2015/0180280 A1* | 6/2015 | Frampton | ............... | H02J 3/48 |
| | | | | 307/53 |
| 2016/0006256 A1* | 1/2016 | Müller | ............... | G05B 19/0425 |
| | | | | 307/84 |
| 2018/0109110 A1* | 4/2018 | Gerdes | ............... | H02K 7/1815 |
| 2021/0112090 A1* | 4/2021 | Rivera | ............... | H04L 63/1425 |
| 2021/0234486 A1 | 7/2021 | Aufderhar et al. | | |

FOREIGN PATENT DOCUMENTS

| | | |
|---|---|---|
| CN | 210468893 U | 5/2020 |
| CN | 211670639 U | 10/2020 |
| CN | 212380949 U | 1/2021 |
| CN | 109747805 B | 3/2021 |
| CN | 216056355 U | 3/2022 |
| EP | 2448087 A1 | 5/2012 |

\* cited by examiner

GENERATOR SET WITH MULTIPLE CONTROLLERS FOR LOAD SHARING

TECHNICAL FIELD

The present disclosure relates generally to a generator set and, for example, to a generator set that includes multiple controllers for load sharing.

BACKGROUND

A generator set may include a generator and a combustion engine. Fuel and air burned within the combustion engine may create a mechanical rotation that drives the generator set to produce electrical power. The electrical power may be provided to a load. In some applications, the electrical power provided to the load may be insufficient. Accordingly, the generator set may be connected, in parallel, to additional generator sets in order to provide sufficient electrical power to the load.

Typically, a single controller controls all necessary functions of the generator set. The functions may include controlling a voltage associated with the generator set, a current associated with the generator set, and/or a speed associated with the generator set. Controlling the functions of the generator set may be a computationally intensive process. Accordingly, using the single controller to control the functions and to control similar functions for the additional generator sets negatively impacts a load on the controller and negatively impact operations of the single controller. Additionally, as the generator set becomes connected to additional generator sets in parallel, a processing speed of the single controller decreases.

U.S. Pat. No. 9,806,530 (the '530 patent) discloses a load sharing power system that is provided including a plurality of generator sets configured to generate an electrical power supply. The '530 patent further discloses that the system further includes a plurality of generator set controllers. The '530 patent also discloses that each of the plurality of generator set controllers is operatively coupled to a respective one of the plurality of generator sets.

In other words, the '530 patent discloses a single controller for controlling an operation of a generator set. However, as explained above, controlling the functions of multiple generator sets with a single controller negatively impacts negatively impacts a load and operations of the single controller.

The generator set including multiple controllers, as described herein, solves one or more of the problems set forth above and/or other problems in the art.

SUMMARY

In some implementations, a first generator set includes an engine; a memory; a network switch; a first controller configured to: adjust local attributes that control an operation of the engine, and store local data representing the local attributes in the memory; and a second controller, in communication with the first controller, configured to: receive, via the network switch, remote data representing remote attributes associated with a second generator set, cause the first controller to update, in the memory and based on the remote data, the local data in the memory to synchronize the local attributes with the remote attributes, and transmit, via the network switch, an indication that the local data was successfully updated in the memory.

In some implementations, a method performed by a first generator set includes storing, by a first controller of the first generator set and in a memory of the first generator set, local data representing local attributes associated with an engine; receiving, by a second controller of the first generator set and via a network switch of the first generator set, remote data representing remote attributes associated with a second generator set; causing, by the second controller, the first controller to update, based on the remote data, the local data in the memory to synchronize the local attributes with the remote attributes; and transmitting, by the second controller and via the network switch, an indication that the local data was successfully updated in the memory.

In some implementations, a system includes a first generator set comprising: an engine; a memory; a network switch; a first controller configured to: store local data representing local attributes, associated with the engine, in the memory; and a second controller, in communication with the first controller, configured to: receive, via the network switch, remote data representing remote attributes associated with a second generator set, cause the first controller to update, in the memory and based on the remote data, the local data in the memory to synchronize the local attributes with the remote attributes, and transmit, via the network switch, an indication that the local data was successfully updated in the memory.

DETAILED DESCRIPTION

Figure 1:
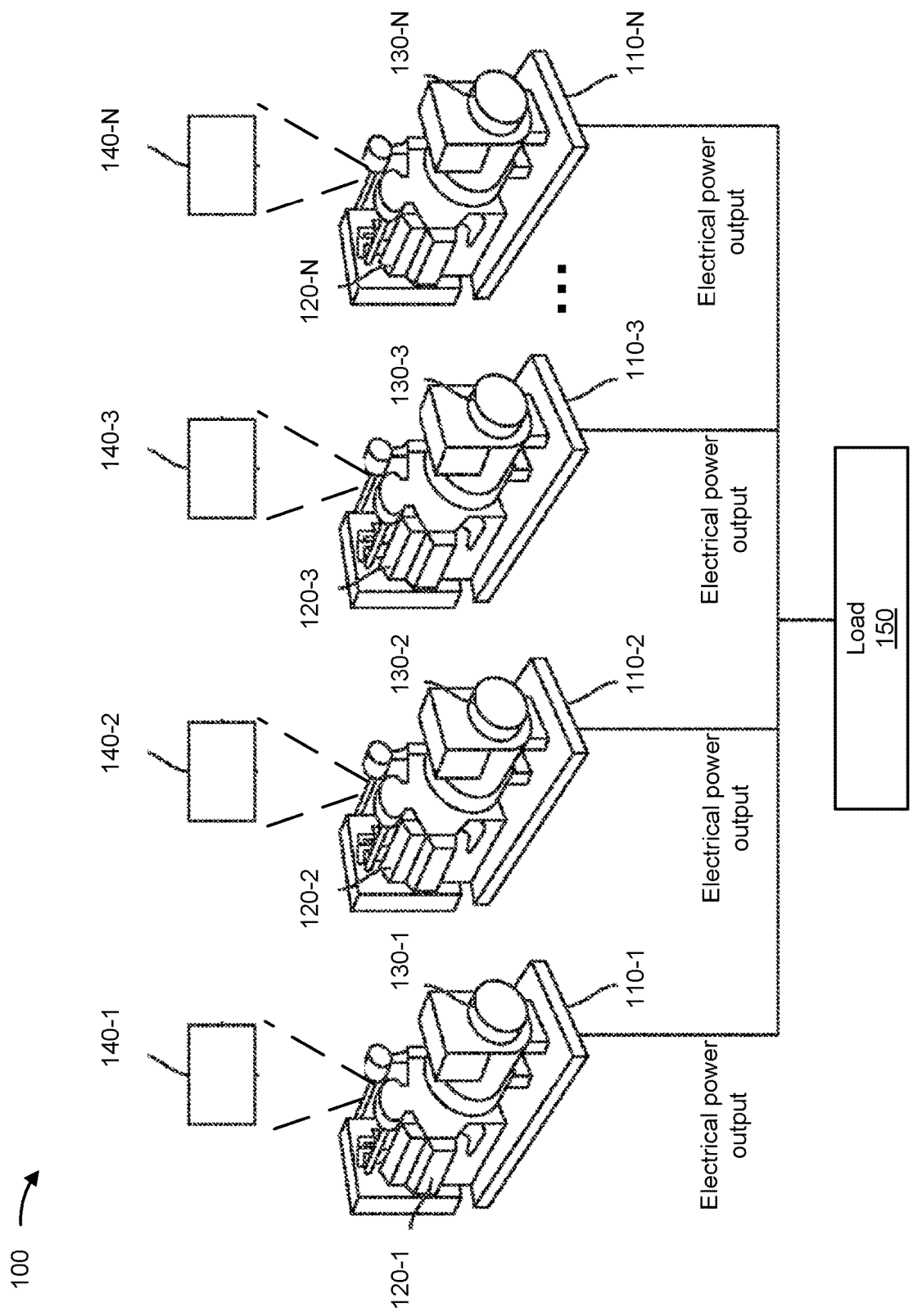
FIG. 1 is a diagram of an example system described herein.

Implementations described herein relate to a generator set that includes multiple controllers for load sharing. For example, the generator set may include a first controller and a second controller. The first controller may be configured to determine local attributes associated with the generator. For example, the first controller may be configured to determine a voltage associated with generator set, a current associated with the generator set, and a speed associated with engine of the generator set. For instance, the voltage may be a voltage of electrical power generated (e.g., based on an operation of the engine), the current may be a current of the electrical power, and the speed may be a rotation of the engine that causes the electrical power to be generated.

In this regard, the term "attribute" may include the voltage, the current, and/or the speed associated with a generator set. The term "local attribute" may refer the voltage, the current, and/or the speed associated with the generator set. The term "remote attribute" refer the voltage, the current, and/or the speed associated with another generator set external with respect to the generator set.

The first controller may provide, to the second controller (included in the generator set), local data representing the local attributes. For example, the local data may include a present value regarding the voltage, a present value regarding the current, and/or a present value regarding the speed.

In some examples, the first controller may provide the local data using a common industrial protocol (CIP) of the Open DeviceNet Vendors Association (ODVA). For example, the first controller may provide the local data using messages associated with the CIP. The first controller may generate the message using assembly objects (e.g., assembly objects associated with Ethernet industrial protocol (Ethernet/IP)).

In some examples, a CIP connection (e.g., a single CIP connection) may be established between the first controller and the second controller. In this regard, the first controller may provide messages to the second controller via the CIP connection. The first controller may provide the messages to facilitate load sharing with one or more additional generator sets. The generator set may be connected to the one or more additional generator sets in parallel.

The second controller may be configured to implement a load sharing application to facilitate load sharing with the one or more additional generator sets. For example, the load sharing application may enable the generator set and the one or more additional generator sets to determine an amount of electrical power to be generated by each generator set. The amount of electrical power (produced by each generator set) may be combined and provided to a load. In some instances, one or more generator sets may provide a different amount of electrical power.

In some examples, the second controller may be connected to one or more controllers of the one or more additional generator sets via one or more CIP connections. For example, the second generator may include a network switch and may establish the one or more CIP connections using the network switch.

In this regard, for example, the second controller may receive remote data representing remote attributes of a particular additional generator set (of the one or more additional generator sets) via a particular CIP connection (of the one or more CIP connections). For example, the remote data may include a present value regarding the voltage associated with the particular additional generator set, a present value regarding the current associated with the particular additional generator set, and/or a present value regarding the speed associated with the particular additional generator. The second controller may receive the remote data via a message associated with the particular CIP connection. The second controller may provide the remote data to the first controller to cause the first controller to update the local attributes based on the remote data.

In some implementations, the generator set may operate as a primary generator set. For example, the second controller may be configured to control an operation of the additional generator set. Accordingly, the second controller may provide the local data to the one or more additional generators via the one or more CIP connections. For example, the second controller may provide the local data via messages associated with the one or more CIP connections. The messages may be transmitted using a multicast communication protocol. The second controller may provide the local data to cause each additional generator to perform an update based on the local attributes.

Accordingly, implementations described herein may utilize messages to reliably facilitate load sharing and/or facilitate the transfer of time-sensitive data between generator sets that are actively providing power to a load (e.g., power producers actively on a advanced paralleling control data link (APC DL) network). Each generator set will implement assembly object to produce data and to be consumed by every other generator set. Further, each generator set will establish one CIP connection (between controllers of the generator set) to produce data and will establish a plurality of CIP connections with controllers of other generator sets.

The controllers described herein may have universal applicability to any machine, machines, or system utilizing such controllers. "Machine" may refer to any device that performs an operation associated with an industry such as, for example, marine, mining, construction, farming, transportation, fracturing, or any other industry. The machine may be a generator system, a generator set (genset), a vehicle (e.g., a land-based vehicle or marine vehicle), and/or a fracture rig, among other examples. Moreover, one or more implements and/or systems may be connected to the machine and/or controlled by the controllers.

FIG. 1 is a diagram of an example system 100 described herein. For example, system 100 may be a power system. As shown in FIG. 1, system 100 may include a plurality of generator sets such as a first generator set 110-1, a second generator set 110-2, a third generator set 110-3, and so on (collectively "generator sets 110" and individually "generator set 110"). As shown in FIG. 1, first generator set 110-1 may include first engine 120-1, first generator 130-1, and first controller package 140-1; second generator set 110-2 may include second engine 120-2, second generator 130-2, and second controller package 140-2; and so on.

First engine 120-1, second engine 120-2, third engine 120-3, and so on may be collectively referred to "engine 120" and individually "engine 120"). First generator 130-1, second generator 130-2, third generator 130-3, and so on may be collectively referred to "generators 130" and individually "generator 130"). First controller package 140-1, second controller package 140-2, third controller package 140-3, and so on may be collectively referred to "controller packages 140" and individually "controller package 140").

In some examples, one or more engines 120 may be an internal combustion engine. Engines 120 may be connected to generators 130 to drive generators 130 to produce electrical power. For example, first engine 120-1 may be connected to first generator 130-1 to drive first generator 130-1 to produce electrical power, second engine 120-2 may be connected to second generator 130-2 to drive second generator 130-2 to produce electrical power, and so on.

A controller package 140 may include multiple controllers configured to control an operation of a generator set 110. In some examples, each controller may be implemented as a processor, such as a programmable logic controller (PLC), CPU, an APU, a microprocessor, a microcontroller, a DSP, a FPGA, an ASIC, or another type of processing component. The processor may be implemented in hardware, firmware, or a combination of hardware and software. The controller may include one or more processors capable of being programmed to perform a function.

One or more memories, including a RAM, a ROM, and/or another type of dynamic or static storage device (e.g., a flash memory, a magnetic memory, and/or an optical memory) may store information and/or instructions for use by the controller. The controller may include a memory (e.g., a non-transitory computer-readable medium) capable of storing instructions, that when executed, cause the processor to perform one or more processes and/or methods described herein.

As an example, first controller package 140-1 may include a first controller and a second controller. The first controller may be configured to determine local attributes of first generator set 110-1 that includes first controller package 140-1 and to provide local data regarding the local attributes to the second controller. In some examples, the first controller may provide the local data periodically (e.g., every thirty millisecond, every hundred milliseconds, among other examples). Alternatively, the first controller may provide the local data based on a trigger (e.g., based on a request from the second controller).

The second controller (of first controller package 140-1 of first generator set 110-1) may be configured to facilitate load sharing with another generator set (e.g., with second generator 110-2 and/or third generator 110-3, among other examples). For example, the second controller may provide the local data to second generator set 110-2 and to third generator 110-3 to facilitate load sharing. Additionally, the second controller may receive, from second generator set 110-2, remote data representing remote attributes of second generator set 110-2 and may provide the remote data to the first controller to cause the first controller to update the local data.

In some implementations, first controller package 140-1, second controller package 140-2, third controller package 140-3, and so on may be connected via a network. As an example, the network may be a network associated with the CIP. For instance, first controller package 140-1, second controller package 140-2, third controller package 140-3, and so on may be connected via an APC DL network. In this regard, the second controller (of first generator set 110-1) may communicate with second generator set 110-2 (e.g., a second controller of second controller package 140-2) via a data link, using an APC DL.

In some examples, power system 100 may be configured to provide primary power and/or backup power to load 150. Load 150 may include any type of power consuming system or device configured to receive electrical power supplied by generator sets 110. Load 150 may include, for example, lights, motors, heating elements, electronic circuitry, refrigeration devices, air conditioning units, and/or computer servers, among other examples.

As indicated above, FIG. 1 is provided as an example. Other examples may differ from what was described in connection with FIG. 1.

Figure 2:
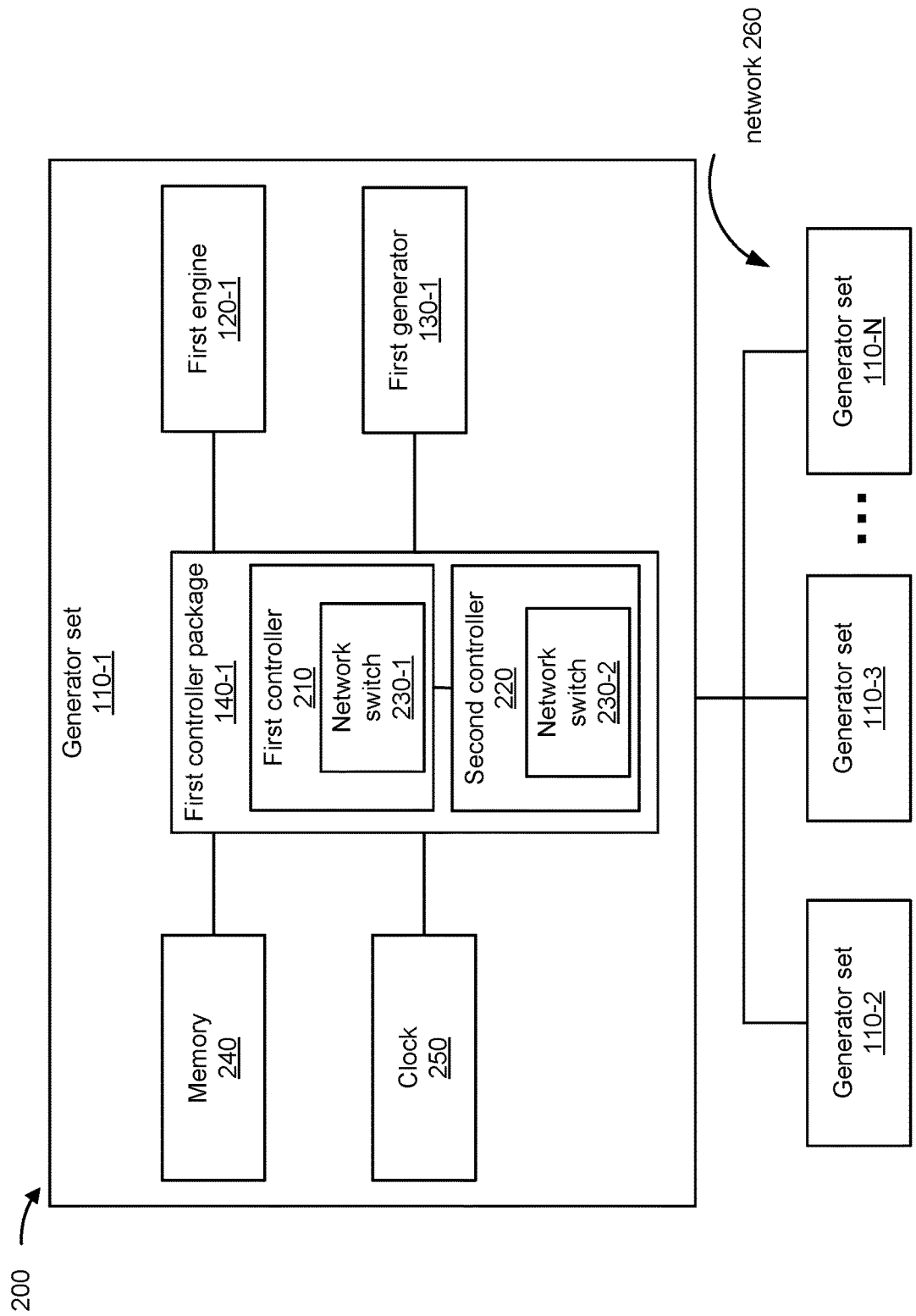
FIG. 2 is a diagram of an example generator set described herein.

FIG. 2 is a diagram 200 of an example generator set described herein. As shown in FIG. 2, first generator set 110-1 is provided as the example generator set. In some examples, first generator set 110-1 may include first engine 120-1, first generator 130-1, first controller package 140-1, memory 240, and clock 250. Some of the elements of first generator set 110-1 have been described above in connection with FIG. 1.

As shown FIG. 2, first controller package 140-1 may include first controller 210 and second controller 220. In some examples, first controller 210 and second controller 220 may be connected via a CIP connection. First controller 210 may determine local attributes associated with first generator set 110-1. First controller 210 may be configured to store local data representing the local attributes in memory 240. Additionally, or alternatively, first controller 210 may provide the local data to second controller 220 to facilitate load sharing with one or more other generator sets (e.g., second generator set 110-2 and/or third generator set 110-3, among other examples). In some examples, first controller 210 may provide the local data to second controller 220 using one or more messages associated with the CIP. The one or more messages may be generated using assembly objects.

As shown in FIG. 2, second controller 220 may include a network switch 230. As an example, network switch 230 may include an ethernet switch. Second controller 220 may be configured to communicate with other generator sets using network switch 230. For example, second controller 220 (of first generator 110-1) may receive remote data representing remote attributes of second generator set 110-2 via network switch 230. For example, second generator set 110-2 may be operating as a primary generator set and second controller 220 may receive the remote data via a message associated with the CIP protocol to synchronize the remote attributes of the primary generator set and the local attributes of first generator 110-1.

In some examples, the message may include information indicating that second generator set 110-2 is the primary generator set. First generator 110-1 may determine that second generator set 110-2 is the primary generator set. Alternatively, first generator 110-1 may receive information identifying generator sets that are actively providing electrical power to load 150. In some examples, the information identifying the generator sets may include a number associated with each generator set. The generator set associated with the lowest number may be considered the primary generator set.

Second controller 220 may provide the remote data to cause first controller 210 to update, in the memory, the local data to synchronize the local attributes with the remote attributes. For example, based on the remote data, first controller 210 may adjust the voltage associated with first generator set 110-1, adjust the current associated with generator set 110-1, and/or adjust the speed associated with engine 120-1 of generator set 110-1. Second controller 220 may provide the remote data to first controller 210 using messages associated with the CIP. The messages may be generated using assembly objects.

Alternatively to providing the remote data to first controller 210, second controller 220 may provide the local data (of first generator set 110-1) to one or more controllers of one or more generator sets via network switch 230. For example, first generator set 110-1 may be a primary generator set. In this regard, second controller 220 may operate as a primary controller that controls operations of multiple generator sets. For example, second controller 220 may provide the local data (of first generator set 110-1) to a controller of second generator set 110-2 to cause the controllers, of second generator set 110-2, to synchronize remote attributes (of second generator set 110-2) with the local attributes, in a manner similar to the manner described herein.

Second controller 220 may provide the local data (of first generator set 110-1) to a controller of third generator set 110-3, to a controller of another generator set, and so on. In some examples, second controller 220 may provide the local data using multiple messages (e.g., via a multicast protocol). The multiple messages may include information indicating that first generator 110-1 is a primary generator set. Additionally, or alternatively, each of the multiple messages may include the information identifying the generator sets actively providing electrical power to load 150.

Memory 240 includes a random-access memory (RAM), a read only memory (ROM), and/or another type of dynamic or static storage device (e.g., a flash memory, a magnetic memory, and/or an optical memory) that stores information (e.g., the local data) and/or instructions for use by a processor of first controller 210 to perform a function, Clock 250 may be an integrated circuit that generates a continuous pulse to regulate the timing and speed of first controller 210 and second controller 220. In some implementations, second controller 220 may identify a generator set 110 that is operating as a primary generator set (e.g., based on a message received from the primary generator set) and may synchronize clock 250 with a clock of the primary generator set. For example, third generator 110-3 may be the primary generator set. Second controller 220 may identify third generator set 110-3 as the primary generator set (e.g., based on the message received from the primary generator set) and may synchronize clock 250 with clock 270 of third generator set 110-3.

As shown in FIG. 2, first generator set 110-1 may connected with the one or more other generator sets 110 via a network 260. Network 260 may include one or more wired and/or wireless networks, such as, for example, a wireless local area network (LAN), a cellular network (e.g., a long-term evolution (LTE) network, a code division multiple access (CDMA) network, a 3G network, a 4G network, a 5G network, among other examples.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
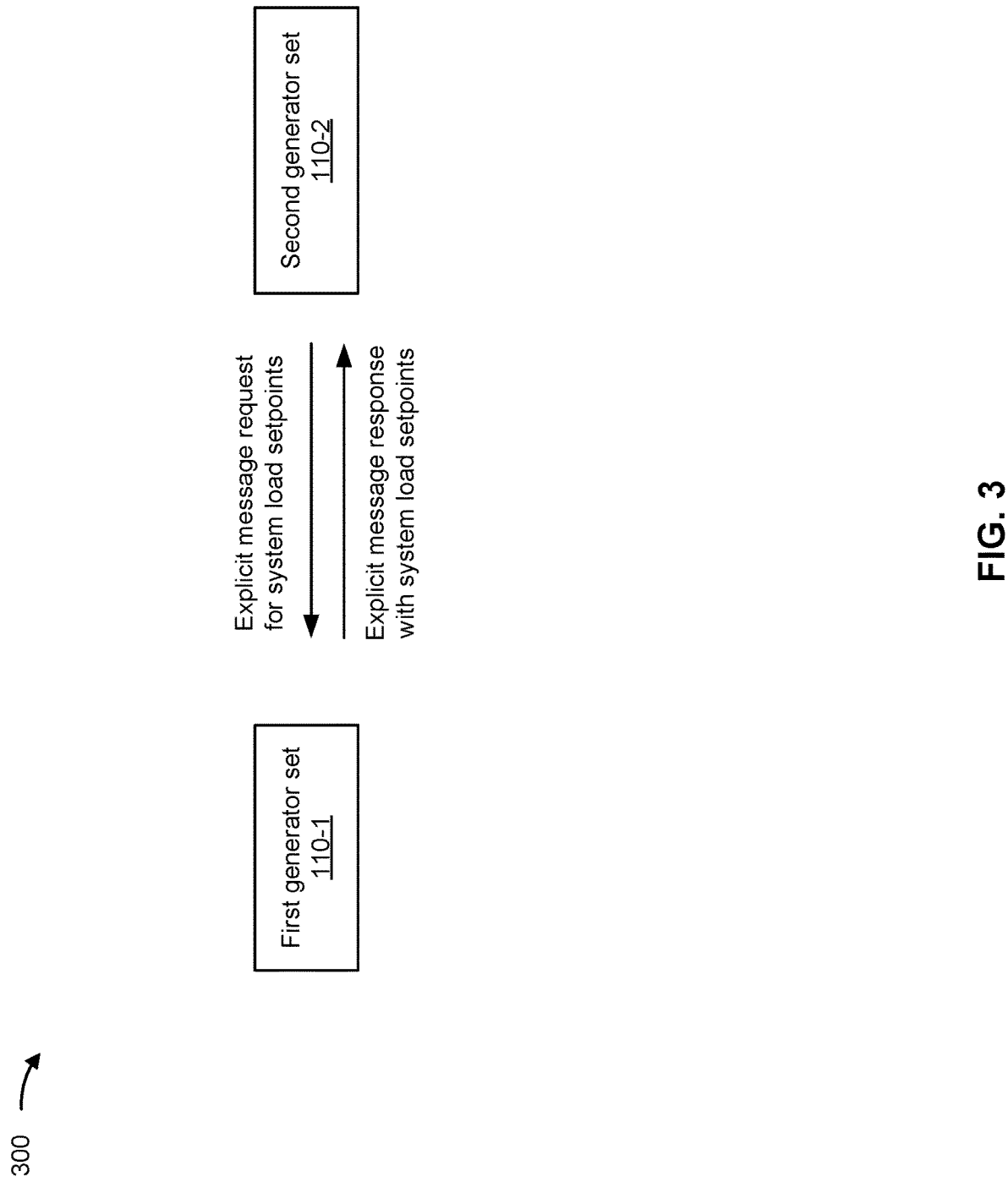
FIG. 3 is a diagram of an example message exchange between multiple generator sets described herein.

FIG. 3 is a diagram of an example message exchange between multiple generator sets described herein. As shown in FIG. 3, first generator set 110-1 may be a primary generator set of a plurality of generator sets actively providing electrical power to a load (e.g., load 150). Second generator set 110-2 may be a generator set that is not currently providing electrical power to the load but has received a command to provide electrical power to the load.

In this regard, based on the command, second generator set 110-2 may provide a request to determine system load setpoints for the plurality of generator sets. For example, second generator set 110-2 may provide a message request to determine present values for the voltage, the current, and/or the speed associated with first generator set 110-1. Based on the message request, first generator set 110-1 may provide a message response that includes the local data representing the local attributes of first generator set 110-1.

Second generator set 110-2 may receive the local data from first generator set 110-1 and may update local attributes of second generator set 110-2 based on local attributes of first generator set 110-1. For example, based on the local data from first generator set 110-1, second generator set 110-2 may adjust a voltage associated with second generator set 110-2, adjust a current associated with second generator set 110-2, and/or adjust a speed associated with second engine 120-2 of second generator set 110-2.

As indicated above, FIG. 3 is provided as an example. Other examples may differ from what was described in connection with FIG. 3.

Figure 4:
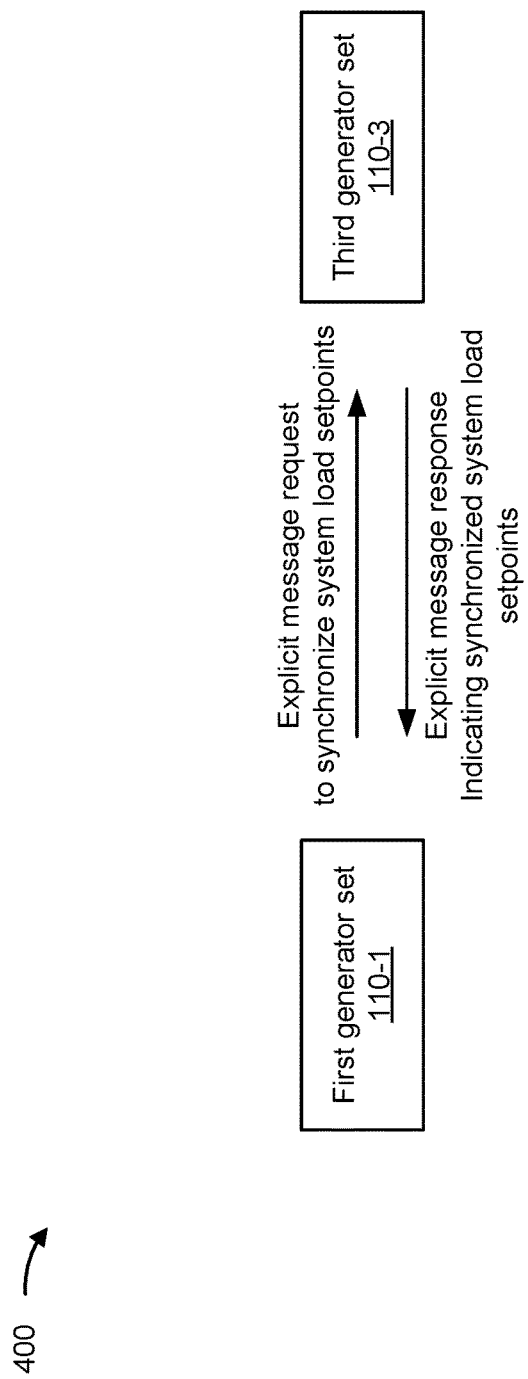
FIG. 4 is a diagram of an example message exchange between multiple generator sets described herein.

FIG. 4 is a diagram of an example message exchange between multiple generator sets described herein. As shown in FIG. 4, first generator set 110-1 may be a primary generator set and third generator set 110-3 may be a generator set of a plurality of generator sets that are actively providing electrical power to load (e.g., load 150). In this regard, as a primary generator set, first generator set 110-1 may determine that remote attributes of third generator set 110-3 are to be synchronized with the local attributes of first generator set 110-1.

Accordingly, first generator set 110-1 may provide a message to request that remote attributes of third generator set 110-3 be synchronized with the local attributes of first generator set 110-1. The message may include the local data representing the local attributes. As shown in FIG. 4, third generator set 110-3 may cause the remote attributes to be synchronized with the local attributes of first generator set 110-1 and provide a message indicating the remote attributes to be synchronized with the local attributes of first generator set 110-1.

As indicated above, FIG. 4 is provided as an example. Other examples may differ from what was described in connection with FIG. 4.

Figure 5:
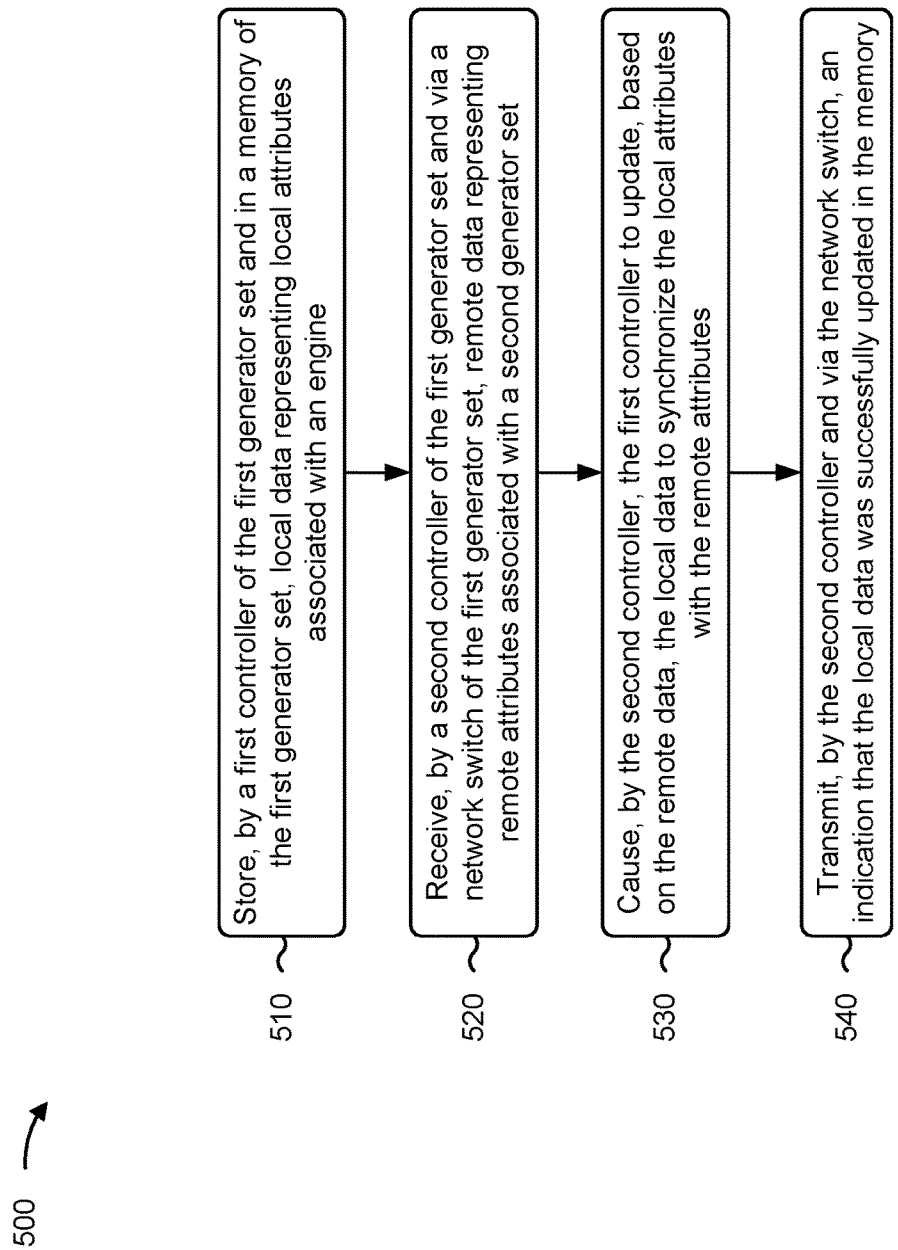
FIG. 5 is a flowchart of an example processes relating to synchronizing genset attributes.

FIG. 5 is a flowchart of an example process 500 associated with synchronizing the generator sets. In some implementations, one or more process blocks of FIG. 5 may be performed by a first generator set (e.g., first generator set 110-1). In some implementations, one or more process blocks of FIG. 5 may be performed by another device or a group of devices separate from or including the first generator set, such as second generator set 110-2 and/or third generator set 110-3.

As shown in FIG. 5, process 500 may include storing, in a memory of the first generator set, local data representing local attributes associated with an engine (block 510). For example, the first generator set may store, in a memory of the first generator set, local data representing local attributes associated with an engine, as described above.

As further shown in FIG. 5, process 500 may include receiving, via a network switch of the first generator set, remote data representing remote attributes associated with a second generator set (block 520). For example, the first generator set may receive, via a network switch of the first generator set, remote data representing remote attributes associated with a second generator set, as described above.

As further shown in FIG. 5, process 500 may include causing the first controller to update, based on the remote data, the local data in the memory to synchronize the local attributes with the remote attributes (block 530). For example, the first generator set may cause the first controller to update, based on the remote data, the local data in the memory to synchronize the local attributes with the remote attributes, as described above.

As further shown in FIG. 5, process 500 may include transmitting, via the network switch, an indication that the local data was successfully updated in the memory (block 540). For example, the first generator set may transmit, via the network switch, an indication that the local data was successfully updated in the memory, as described above.

In some implementations, process 500 includes receiving, by the second controller, the local data from the first controller, and transmitting, via the network switch, the local data to a third generator set.

In some implementations, the local attributes identify a voltage associated with the engine, a current associated with the engine, and a speed associated with the engine.

In some implementations, process 500 includes transmitting the local data to a third generator set via a multicast communication protocol.

In some implementations, process 500 includes identifying, by the second controller, a primary generator set, and synchronizing, by the second controller, a clock of the first generator set with a clock of the primary generator set.

In some implementations, process 500 includes causing, by the second controller, the first generator set to function as a master power generator.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

Implementations described herein relate to a generator set that include multiple controllers for load sharing. For example, a first controller (of the multiple controllers) may be configured to determine local attributes associated with the generator. The first controller may provide, to the second controller, local data representing the local attributes.

The second controller may be configured to implement a load sharing application to facilitate load sharing with the one or more additional generator sets based on the local data and/or based on remote data representing remote attributes of the one or more additional generator sets.

Typically, a generator set typically includes a single controller that controls all necessary functions of the generator set. Using the single controller to control the functions and to control similar functions for the additional generator sets negatively impacts a load on the controller and negatively impact operations of the single controller. By using multiple controllers for a single generator set as described herein, implementations described may prevent negative impacts on the load and on the operations of the single controller.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first generator set, comprising:
an engine;
a memory;
a network switch;
a first controller configured to:
adjust local attributes that control an operation of the engine, and
store local data representing the local attributes in the memory; and
a second controller, in communication with the first controller, configured to:
receive, via the network switch and from a second generator set, remote data representing remote attributes associated with the second generator set,
cause the first controller to update, in the memory and based on the remote data, the local data in the memory to synchronize the local attributes with the remote attributes,
wherein, to cause the first controller to update the local data in the memory to synchronize the local attributes with the remote attributes, the second controller is configured to:
provide, from the second controller and to the first controller, the remote data, and
transmit, via the network switch, an indication that the local data was successfully updated in the memory.

2. The first generator set of claim 1, wherein the second controller is further configured to:
receive the local data from the first controller; and
transmit, via the network switch, the local data to a third generator set.

3. The first generator set of claim 2, wherein, to transmit the local data, the second controller is further configured to:
transmit the local data to the third generator set via a multicast communication protocol.

4. The first generator set of claim 1, further comprising a clock,
wherein the second controller is further configured to:
identify a primary generator set; and
synchronize the clock with a clock of the primary generator set.

5. The first generator set of claim 4, wherein the primary generator set is the second generator set, and
wherein, to receive the remote data, the second controller is further configured to receive the remote attributes from the primary generator set.

6. The first generator set of claim 1, wherein the local attributes identify a voltage associated with the engine, a current associated with the engine, and a speed associated with the engine.

7. The first generator set of claim 1, wherein the first generator set is included in a network that includes a plurality of generators, and
wherein the second controller is further configured to:
cause the first generator set to function as a primary generator set.

8. A method performed by a first generator set, the method comprising:
storing, by a first controller of the first generator set and in a memory of the first generator set, local data representing local attributes associated with an engine;
receiving, by a second controller of the first generator set, from a second generator set, and via a network switch of the first generator set, remote data representing remote attributes associated with the second generator set;
causing, by the second controller, the first controller to update, based on the remote data, the local data in the memory to synchronize the local attributes with the remote attributes,
wherein causing the first controller to update the local data in the memory to synchronize the local attributes with the remote attributes comprises:
providing, from the second controller and to the first controller, the remote data; and
transmitting, by the second controller and via the network switch, an indication that the local data was successfully updated in the memory.

9. The method of claim 8, further comprising:
receiving, by the second controller, the local data from the first controller; and
transmitting, via the network switch, the local data to a third generator set.

10. The method of claim 8, wherein the local attributes identify a voltage associated with the engine, a current associated with the engine, and a speed associated with the engine.

11. The method of claim 8, further comprising:
transmitting the local data to a third generator set via a multicast communication protocol.

12. The method of claim 8, further comprising:
identifying, by the second controller, a primary generator set; and
synchronizing, by the second controller, a clock of the first generator set with a clock of the primary generator set.

13. The method of claim 8, further comprising:
causing, by the second controller, the first generator set to function as a master power generator.

14. A system, comprising:
a first generator set comprising:
an engine;
a memory;
a network switch;
a first controller configured to:
store local data representing local attributes, associated with the engine, in the memory; and
a second controller, in communication with the first controller, configured to:
receive, via the network switch and from a second generator set, remote data representing remote attributes associated with the second generator set,
cause the first controller to update, in the memory and based on the remote data, the local data in the memory to synchronize the local attributes with the remote attributes,
wherein, to cause the first controller to update the local data in the memory to synchronize the local attributes with the remote attributes, the second controller is configured to:
provide, from the second controller and to the first controller, the remote data and
transmit, via the network switch, an indication that the local data was successfully updated in the memory.

15. The system of claim 14, wherein the second controller is further configured to:
receive the local data from the first controller; and
transmit, via the network switch, the local data to a third generator set.

16. The system of claim 14, wherein the second controller is further configured to:
transmit the local data to a third generator set via a multicast communication protocol.

17. The system of claim 14, wherein the first generator set further comprises a clock, and
wherein the second controller is further configured to:
identify a primary generator set; and
synchronize the clock with a clock of the primary generator set.

18. The system of claim 14, wherein the primary generator set is the second generator set, and
wherein, to receive the remote data, the second controller is further configured to receive the remote attributes from the primary generator set.

19. The system of claim 14, wherein the local attributes identify a voltage associated with the engine, a current associated with the engine, and a speed associated with the engine.

20. The system of claim 14, wherein the first generator set is included in a network that includes a plurality of generators, and
wherein the second controller is further configured to:
cause the first generator set to function as a primary generator set.

* * * * *